United States Patent
Kang et al.

(10) Patent No.: US 12,067,863 B2
(45) Date of Patent: Aug. 20, 2024

(54) REMOTE CONTROL SYSTEM USING UWB AND METHOD OF THE SAME

(71) Applicant: SAMSUNG ELECTRONICS CO., LTD., Suwon-si (KR)

(72) Inventors: Kunsok Kang, Suwon-si (KR); Eungsik Yoon, Suwon-si (KR); Hyunkyu Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/892,706

(22) Filed: Aug. 22, 2022

(65) Prior Publication Data

US 2023/0079351 A1  Mar. 16, 2023

Related U.S. Application Data

(63) Continuation of application No. PCT/KR2022/010420, filed on Jul. 18, 2022.

(30) Foreign Application Priority Data

Sep. 16, 2021 (KR) .................. 10-2021-0124194

(51) Int. Cl.
*G08C 17/02* (2006.01)
(52) U.S. Cl.
CPC ......... *G08C 17/02* (2013.01); *G08C 2201/32* (2013.01); *G08C 2201/91* (2013.01)

(58) Field of Classification Search
CPC .......................... G08C 17/02; G08C 2201/32; G08C 2201/91; H04N 5/4403; G06F 3/0346; G06F 16/433; G06F 16/434; G01S 5/02585; G01S 3/043
See application file for complete search history.

(56) References Cited

U.S. PATENT DOCUMENTS

| 7,962,150 | B2 | 6/2011 | Hertzog et al. |
| 2018/0027203 | A1* | 1/2018 | Clay ............... H04N 21/42204 |
| | | | 348/734 |
| 2021/0209935 | A1* | 7/2021 | Al-Kadi .............. G01S 3/043 |

(Continued)

FOREIGN PATENT DOCUMENTS

| JP | 2008-224584 | 9/2008 |
| JP | 2021-506047 | 2/2021 |
| KR | 10-2012-0056698 | 6/2012 |

(Continued)

OTHER PUBLICATIONS

Search Report dated Oct. 28, 2022 issued in International Patent Application No. PCT/KR2022/010420.

*Primary Examiner* — Vernal U Brown
(74) *Attorney, Agent, or Firm* — Nixon & Vanderhye P.C.

(57) ABSTRACT

A remote control system may include a display device including a first ultra wideband (UWB) anchor that uses UWB communications, a second UWB anchor that uses UWB communications and is spaced apart from the first UWB anchor by a specified distance or more, and a remote control. The remote control system may be configured to select a control target device and control it by identifying the relative coordinates of the remote control using UWB communications, and identify the orientation direction of the remote control using a 9-axis sensor value.

20 Claims, 16 Drawing Sheets

(56) References Cited

U.S. PATENT DOCUMENTS

2022/0405317 A1* 12/2022 Marks .................... G06V 20/20
2023/0060497 A1*  3/2023 Soh ......................... H04Q 9/00

FOREIGN PATENT DOCUMENTS

| KR | 10-1233783 | 2/2013 |
| KR | 10-2009791 | 8/2019 |
| KR | 10-2020-0069060 | 6/2020 |
| KR | 10-2135313 | 7/2020 |
| KR | 10-2021-0038128 | 4/2021 |

* cited by examiner

REMOTE CONTROL SYSTEM USING UWB AND METHOD OF THE SAME

CROSS-REFERENCE TO RELATED APPLICATIONS

This application is a continuation of International Application No. PCT/KR2022/010420 designating the United States, filed on Jul. 18, 2022, in the Korean Intellectual Property Receiving Office and claiming priority to Korean Patent Application No. 10-2021-0124194 filed on Sep. 16, 2021, in the Korean Intellectual Property Office, the disclosures of which are incorporated by reference herein in their entireties.

BACKGROUND

1. Field

The disclosure relates to a remote control system using UWB (Ultra-Wideband).

2. Description of Related Art

Technological development in semiconductors and wireless communications promotes the development of various technologies. In particular, Internet of Things (IoT) technology, capable of exchanging data among devices in real time, has been developed.

IoT is an upgrade of the existing ubiquitous (USN (Ubiquitous Sensor Network)) or M2M (Machine to Machine) communications, connecting devices having a communications function to a network, enabling mutual communications among them.

IoT enables users to easily control IoT devices without time and space restrictions.

However, devices are required to be registered in IoT-related applications (or a server that manages the IoT-related applications) to use the IoT technology.

SUMMARY

Embodiments of the disclosure may provide a control target device that may be registered by identifying relative positions among a first UWB anchor included in a TV, a second UWB anchor, and a remote control using the interaction of UWB and by bringing the remote control close to the control target device to identify its position.

Embodiments of the disclosure may also provide an intuitive remote control for a control target device by identifying an orientation direction of a remote control and controlling a control target device existing in the orientation direction of the remote control.

A remote control method using ultra-wideband (UWB) in a display device of a remote control system according to an example embodiment includes: identifying, by a display device, a first distance between a remote control and a first UWB anchor and a second distance between the remote control and a second UWB anchor; identifying, by the display device, a first angle between a first direction based on the remote control pointing at the first UWB anchor and a second direction based on the remote control pointing at the second UWB anchor or a third distance between the first UWB anchor and the second UWB anchor; identifying, by the display device, the relative coordinates of the remote control based on the display device, using the first distance, the second distance and the first angle or using the first distance, the second distance and the third distance; and determining, by the display device, the orientation direction of the remote control based on the display device receiving a 9-axis sensor value of the remote control from the remote control.

A display device of an ultra-wideband (UWB) a remote control system according to an example embodiment includes: a communications unit comprising communication circuitry configured to communicate with a remote control and a processor, wherein the processor is configured to: identify a first distance between the remote control and a first UWB anchor and a second distance between the remote control and a second UWB; identifying a first angle between a first direction based on the remote control pointing at the first UWB anchor and a second direction based on the remote control pointing at the second UWB anchor or a third distance between the first UWB anchor and the second UWB anchor; identifying a first distance between the remote control and the first UWB anchor and the second distance between the remote control and a second UWB anchor in the display device; identifying the relative coordinates of the remote control based on the display device, using the first distance, the second distance and the first angle or using the first distance, the second distance and the third distance; and determining the orientation direction of the remote control based on the display device receiving a 9-axis sensor value of the remote control from the remote control.

A remote control method using ultra-wideband (UWB) in a remote control of a remote control system according to an example embodiment includes: measuring, in a remote control, a first distance that between a first UWB anchor included in a display device and the remote control, using UWB communications; measuring, by the remote control, a second distance between a second UWB anchor and the remote control, using the UWB communications; measuring, by the remote control, a first angle between a first direction based on the remote control pointing at the first UWB anchor and a second direction when the remote control pointing at the second UWB anchor; identifying, by the remote control, the relative coordinates of the remote control based on the display device, using the first distance, the second distance, and the first angle in the remote control; and determining, by the remote control, the orientation direction of the remote control, using a 9-axis sensor value in the remote control.

According to various example embodiments, a control target device may be registered by identifying relative positions among a first UWB anchor included in a display device, a second UWB anchor spaced apart from the first UWB anchor by a predetermined (e.g., specified) distance or more, and a remote control and by bringing the remote control close to the control target device to identify its position. An intuitive remote control may be available by controlling the control target device existing in the orientation direction of the remote control according to the orientation direction of the remote control.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
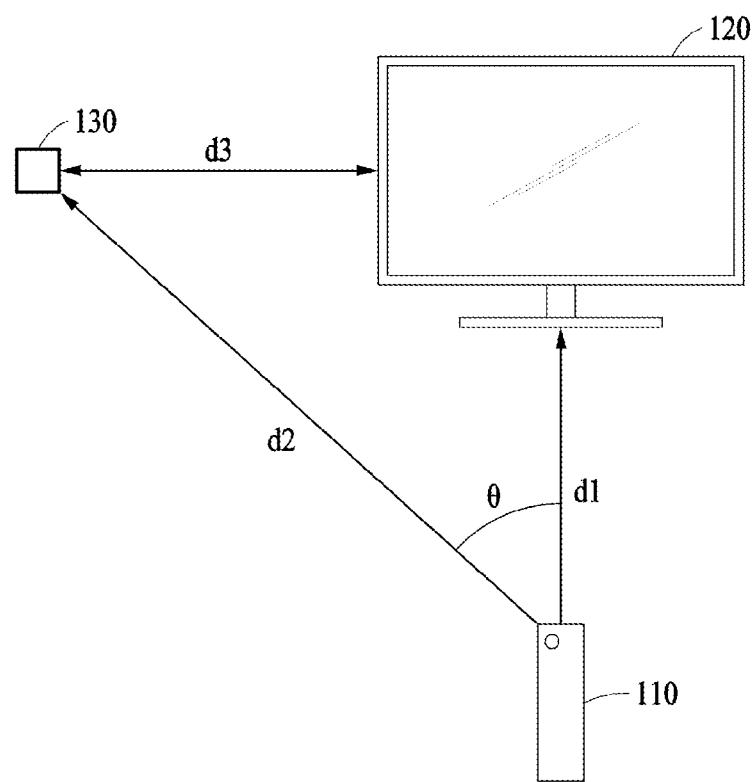
FIG. 1 is a diagram illustrating an example configuration of a remote control system using UWB according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

Hereinafter, according to an example embodiment of the present disclosure a remote control system using UWB and a method thereof will be described in greater detail with reference to the accompanying FIGS. 1 to 16.

FIG. 1 is a diagram illustrating an example configuration of a remote control system using UWB according to various embodiments.

Referring to FIG. 1, a remote control system may include a remote control 110, a display device 120, and a second UWB anchor 130.

The display device 120 includes a first UWB anchor using Ultra-WideBand communications. In this case, the first UWB anchor of the display device 120 may be a UWB module installed in the display device 120 or a UWB module mounted in the display device 120 in the form of an accessory. One representative display device 120 for the remote control system may be a television (TV).

The second UWB anchor 130 uses UWB communications and is spaced apart from the display device 120 by a predetermined distance or more. It may be preferable that the second UWB anchor 130 is installed to the left or right side of the first UWB anchor included in the display device 120 at the same height.

The second UWB anchor 130 may be installed at an arbitrary position spaced apart by a predetermined distance or more but may be set at a predetermined distance in a specific direction from the display device 120. In this case, the second UWB anchor may be included along with the first UWB anchor in the display 120 when the display device has wider than a required predetermined distance between the first UWB anchor and the second UWB anchor.

The remote control 110 may use UWB communications to identify relative coordinates from the display device 120 and register and control a control target device to remotely control. In this case, the remote control 110 may be a remote control having a UWB module, a mobile terminal having a UWB module, or a portable terminal having a UWB module.

The remote control 110 measures a first distance d1 that is a distance between the first UWB anchor and the remote control 110 and a second distance d2 that is a distance between the second UWB anchor 130 and the remote control 110, measures a first angle θ that is an angle between a first direction when the remote control 110 points at the first UWB anchor included in the display device 120 and a second direction when the remote control 110 points at the second UWB anchor 130, and uses the first distance, the second distance, and the first angle to identify its relative coordinates based on the display device 120. In this case, the remote control 110 may use the first distance, the second distance, and the first angle based on the triangulation formula to identify its relative coordinates based on the display device 120 and transmit its identified coordinates to the display device 120.

In the case of identifying the relative coordinates of the remote control 110 for the first time, a third distance that is a distance between the first UWB anchor and the second UWB may be measured with the measured first angle. Accordingly, the relative coordinates of the remote control may be measured without the measurement of the first angle only when the first and the second distances along with the fixed third distance are measured due to the fixed position of the first and second UWB anchors.

The remote control 110 may detect a change in the 9-axis sensor value of the remote control 110 to determine the orientation direction of the remote control 110. The remote control 110 may transmit the orientation direction of the remote control 110 to the display device 120.

As described herein, the remote control 110 may identify its relative coordinates and its orientation direction by itself and transmit the information to the display device 120. However, in another example embodiment, the remote control 110 may measure the first distance, the second distance and the first angle to transmit to the display device 120 and measure a 9-axis sensor value to transmit to the display device 120, so that the display device 120 may identify the relative coordinates and the orientation direction of the remote control 110.

The example embodiments of identifying the relative coordinates and the orientation direction of the remote control 110 in the remote control 110 will be described in greater detail below with reference to FIGS. 9, 11, and 12.

The example embodiments of identifying the relative coordinates and the orientation direction of the remote control 110 in the display device 120 will be described in greater detail below with reference to FIGS. 10 and 13 to 16.

When receiving or identifying by itself the relative coordinates of the remote control 110, the display device 120 may display the relative positions among the first UWB anchor, the second UWB anchor 130, and the remote control 110. That is, each relative position of the display device 120, the second UWB anchor 130, and the remote control 110 may be marked and displayed on the screen of the display device 120.

Figure 2:
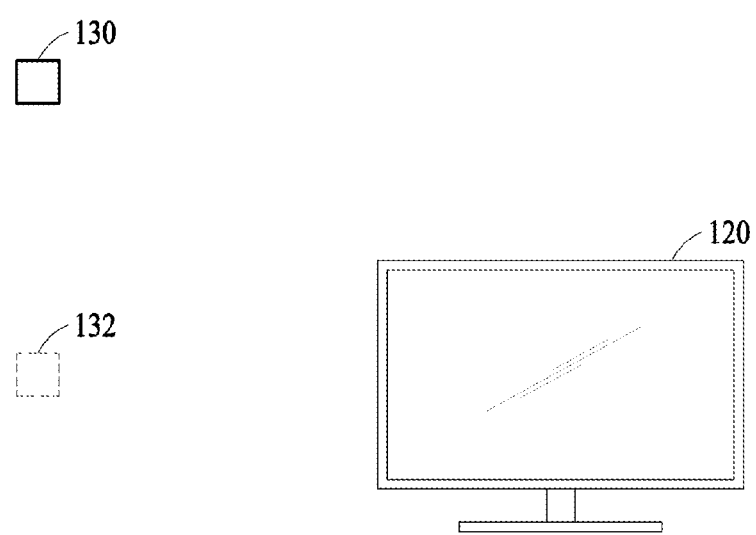
FIG. 2 is a diagram illustrating an example in which the position of a second UWB anchor is higher than that of a display device in a remote control system according to various embodiments.

However, in measuring a first distance and a second distance, when the height of a first UWB anchor is different from that of a second UWB anchor 130 as shown in FIG. 2, an error may occur in measuring the coordinates of a remote control 110.

FIG. 2 is a diagram illustrating an example in which the position of a second UWB anchor is higher than that of a display device in a remote control system according to various embodiments.

Referring to FIG. 2, a second UWB anchor 130 is installed higher than a first UWB anchor of a display device 120.

Figure 3:
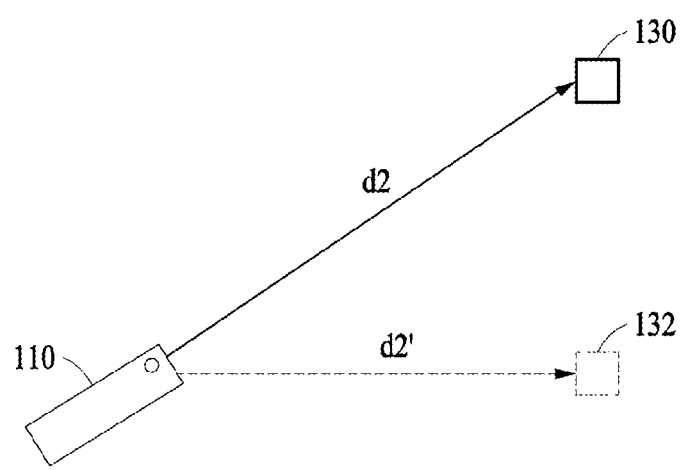
FIG. 3 is a diagram illustrating an example of adjusting the position of a second UWB anchor in a remote control system according to various embodiments.

In order to more accurately measure the coordinates of the remote control 110, it is preferable that the second UWB anchor 130 is positioned at a virtual position of the second UWB anchor 132, which is the same height as the first UWB anchor of the display device 120. FIG. 3 is a diagram illustrating an example of adjusting the position of a second UWB anchor in a remote control system according to various embodiments.

Referring to FIG. 3, a remote control 110 may detect a change in its inclination through a 9-axis sensor and calculate d2', a distance from the remote control 110 to a virtual second UWB anchor 132.

Figure 4:
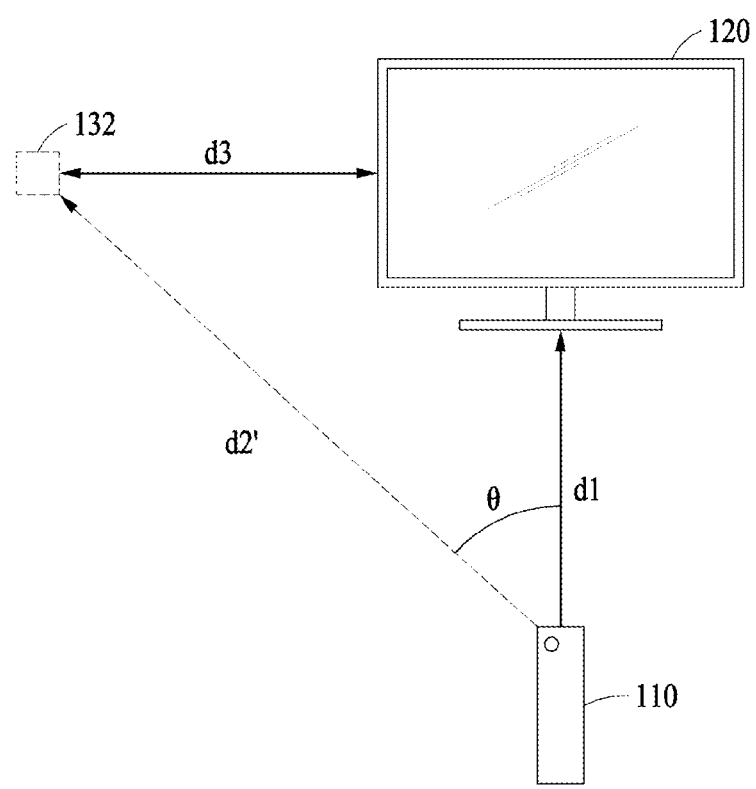
FIG. 4 is a diagram illustrating an example of measuring a distance by projection to a two-dimensional plane in the remote control system according to various embodiments.

FIG. 4 is a diagram illustrating an example of measuring a distance by projection to a two-dimensional plane in the remote control system according to various embodiments.

Referring to FIG. 4, to calculate the coordinates of a remote control 110, using distance and angle values measured at the same height, the remote control 110 may project the remote control 110 and a second UWB anchor 130 to a two-dimensional plane to calculate the relative coordinates of the remote control 110.

In FIG. 4 in which the second UWB anchor 130 is installed relatively higher, the coordinates of the remote control 110 may be calculated more accurately by measuring a second distance to a virtual second UWB distance 132 projected to a second dimensional plane.

Figure 5:
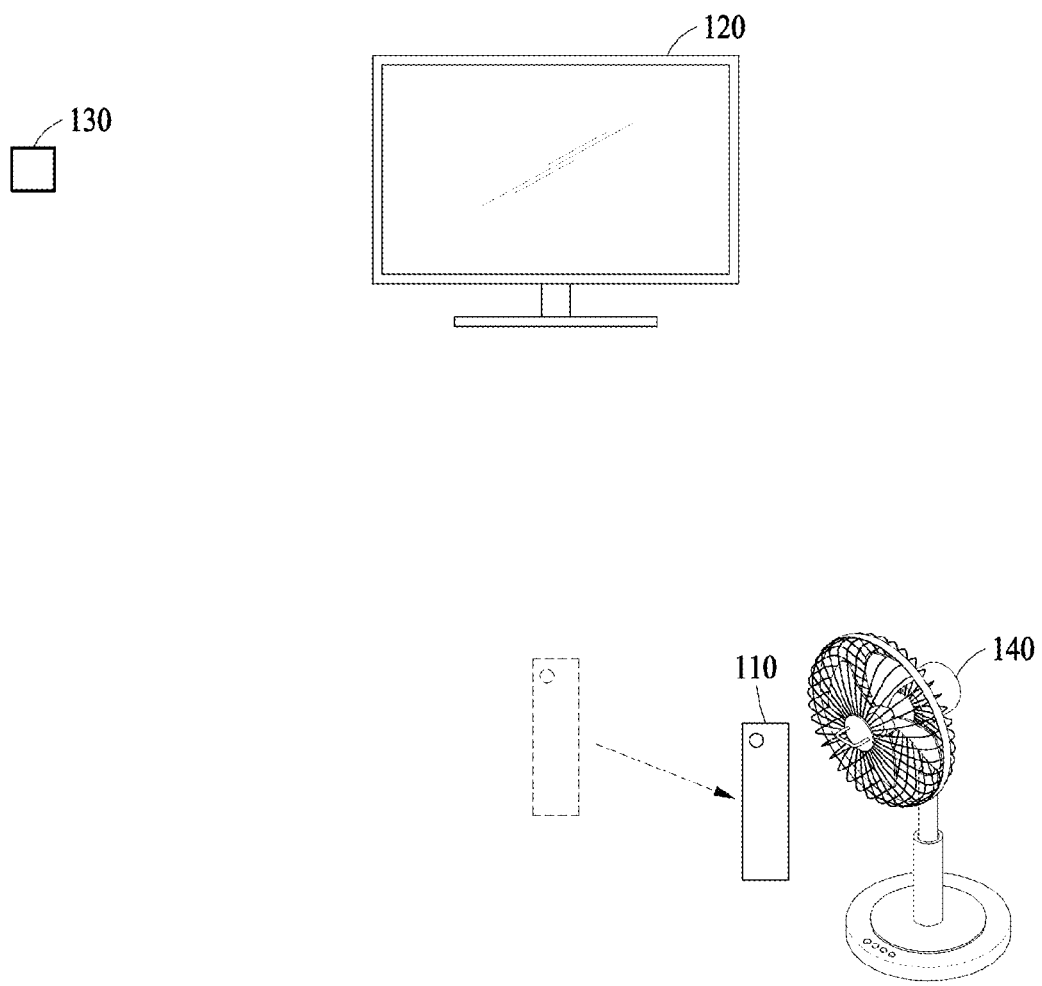
FIG. 5 is a diagram illustrating an example of registering a control target device in a remote control system according to various embodiments.

FIG. 5 is a diagram illustrating an example of registering a control target device in a remote control system according to various embodiments.

Referring to FIG. 5, when a remote control 110 detects a key input that requests registration at the position close to a control target device 140 to register, the remote control 110 may use UWB to identify its relative coordinates at the position close to the control target device, and transmit, to the display device 120, its relative coordinates identified at the position close to the control target device 140 as the position of the control target device 140.

When the remote control 110 detects a key input that requests registration at the position close to the control target device 140 to register, the remote control 110 may transmit, to the display device 120, a first distance and a second distance measured using UWB to provide the position of the control target.

The display device 120 may identify the relative coordinates of the remote control 110 identified at the position close to the control target device 140 as the position of the control target device 140 and register the control target device 140.

Figure 6:
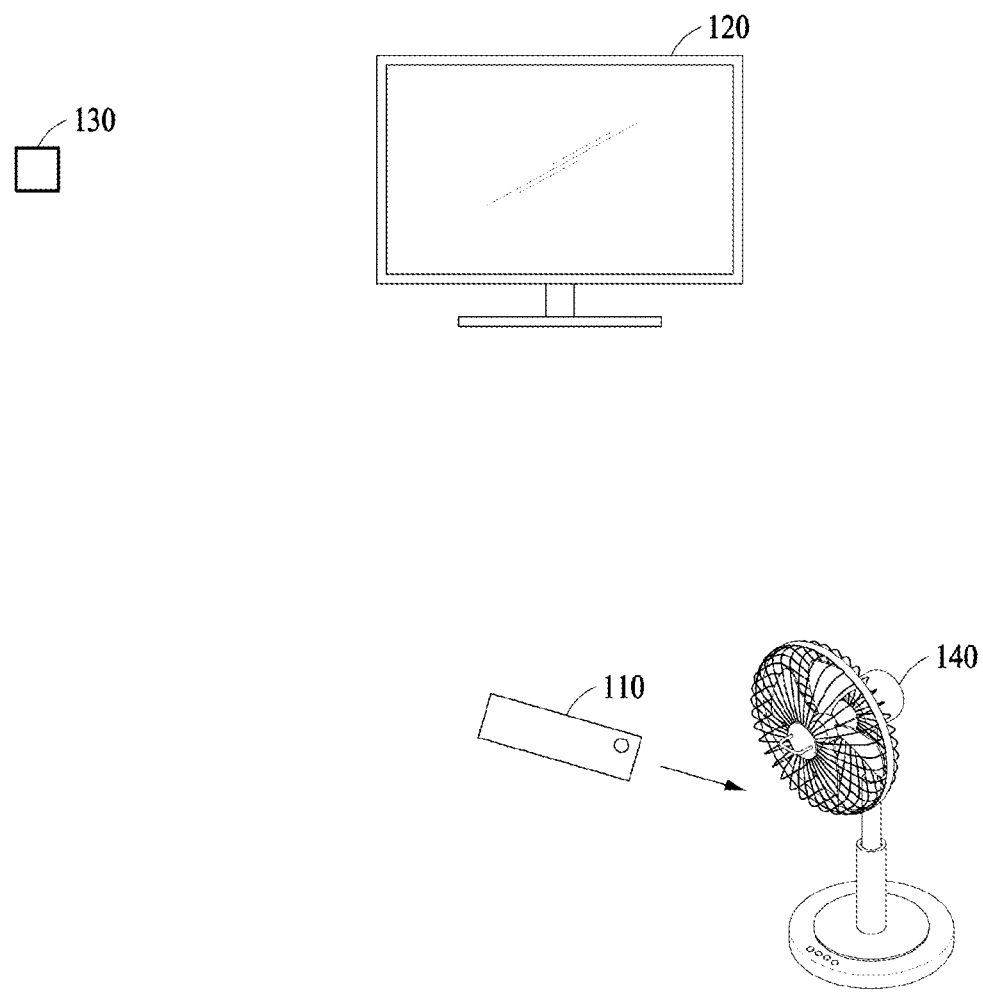
FIG. 6 is a diagram illustrating an example of selecting and controlling a control target device through an orientation direction in a remote control system according to various embodiments.

FIG. 6 is a diagram illustrating an example of selecting and controlling a control target device through an orientation direction in a remote control system according to various embodiments.

Referring to FIG. 6, a remote control 110 may transmit its coordinates and its orientation direction to a display device 120, and provide a key input, if detected, to the display device 120.

The display device 120 may identify whether there is a control target device registered as a control target device in the orientation direction of the remote control 110 on the received or identified relative coordinates of the remote control 110. If any, the display device 120 may identify the information required to control the control target device 140 and when receiving a key input to control the control target device 140 from the remote control 110, convert the key input into a control signal corresponding to the key input to control the control target device 140. In this case, the information about the control target device may be information for identifying the control target device or information regarding which control signal the key input of the remote control matches with.

For example, the remote control 110 may control, through the display device 120, the control target device 140 by, for example, turning on and off a fan, adjusting its direction or speed.

The display device 120 may store information on the control target device 140 and, if not stored, request and receive from a separate server the information to update.

The control target device 140 may be controlled by not only the display device 120 as described herein but also the remote control 110.

When the remote control 110 controls the control target device 140, the display device 120 may identify whether the registered control target device 140 exists in the orientation direction of the remote control 110 based on the relative coordinates of the remote control 110 and may identify the information on the control target device 140, if any, and transmit the information to the remote control 110.

The remote control 110 may transmit its coordinates and orientation direction to the display device 120 and convert the key input of the remote control into a control signal corresponding to the key input upon the detection of the key input, using the received or pre-stored information of the control target device 140, to control the control target device 140.

Figure 7:
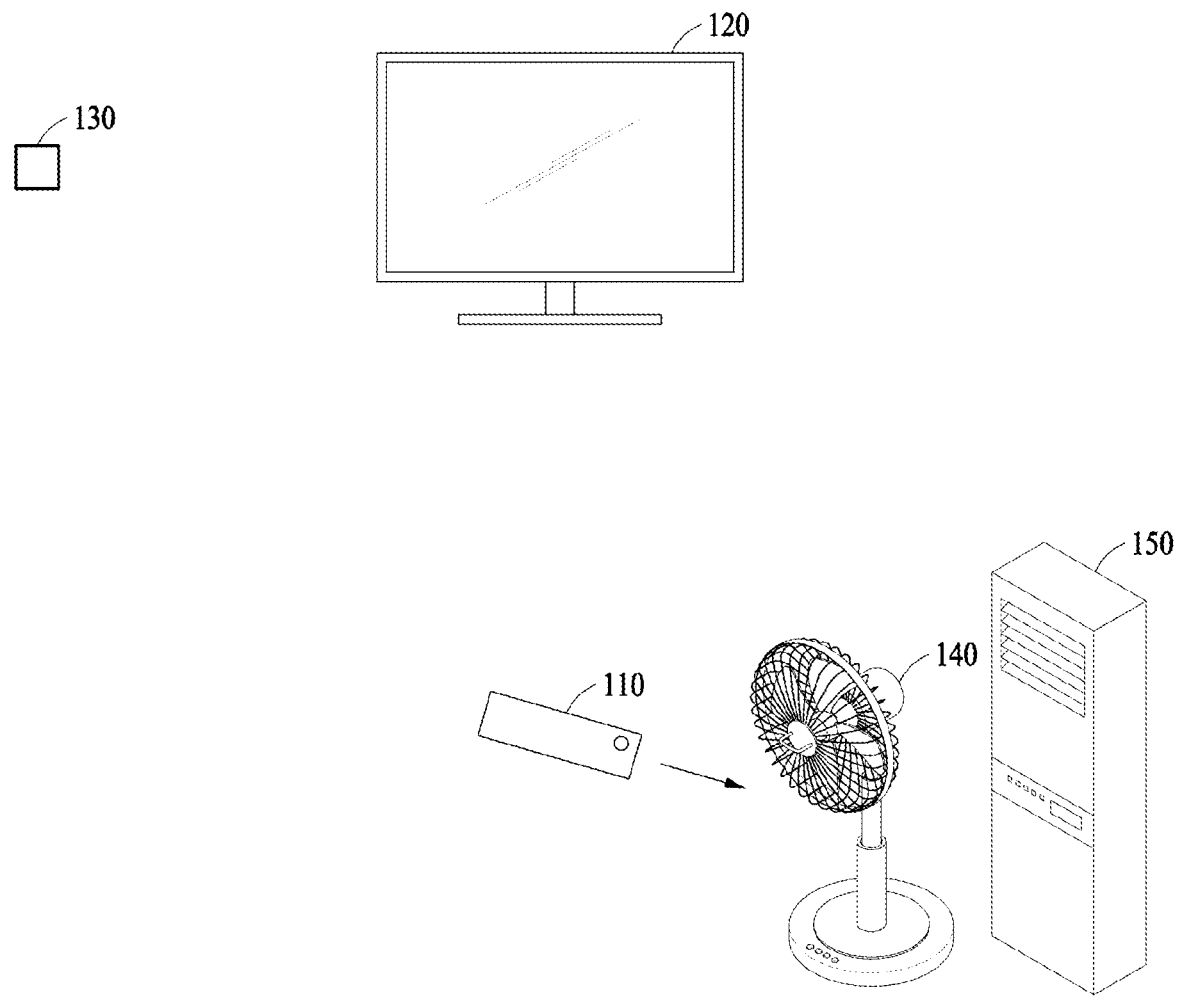
FIG. 7 is a diagram illustrating an example of a plurality of control target devices existing in an orientation direction in a remote control system according to various embodiments.

FIG. 7 is a diagram illustrating an example of a plurality of control target devices existing in an orientation direction in a remote control system according to various embodiments.

Referring to FIG. 7, there are two control target devices 140 and 150 in the orientation direction of the remote control 110, but it is unknown which device a user wants to control through a remote control 110.

When there is a plurality of control target devices 140 and 150 in the orientation direction of the remote control 110 based on relative coordinates of the remote control 110, the display device 120 may display a list of the control target devices 140 and 150 existing in the orientation direction on its screen to allow selection of a control target device through the remote control 110.

Figure 8:
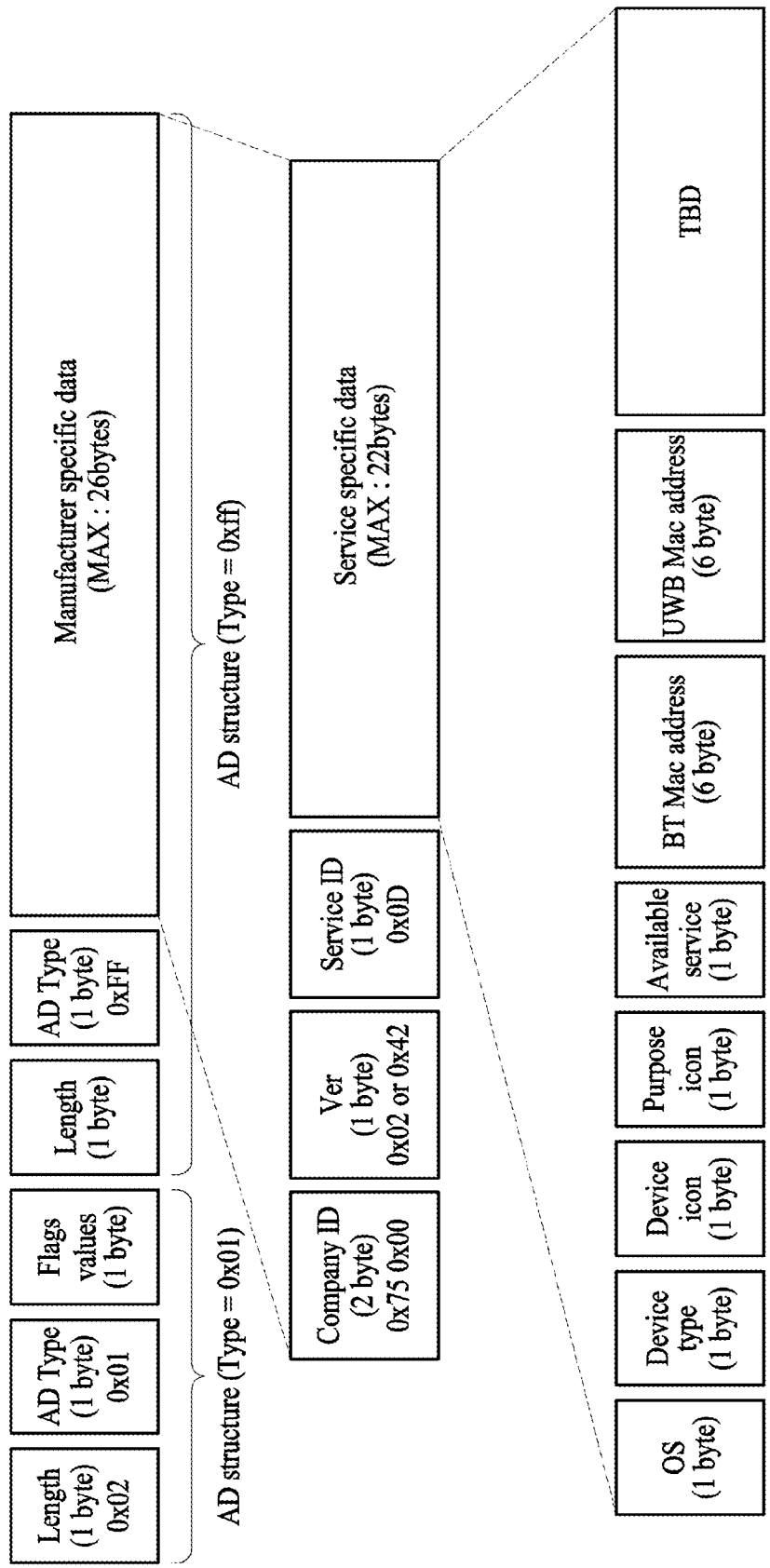
FIG. 8 is a diagram illustrating an example packet for communications between a remote control and a display device in a remote control system according to various embodiments.

The remote control 110 may use the ADV_IND packet of FIG. 8 for communications with the display device 120.

FIG. 8 is a diagram illustrating an example packet for communications between a remote control and a display device in a remote control system according to various embodiments.

Referring to FIG. 8, one bit of the Purpose field may be configured as a UWB mode.

When the UWB mode is set in the Purpose field, the UWB MAC addresses of a remote control 110, a first UWB anchor, and a second UWB anchor 130 may be included in the UWB Mac address field, and information such as the coordinates of the remote control 110, a first distance d1, a second distance d2, and a first angle θ may be included through the TBD field.

Figure 9:
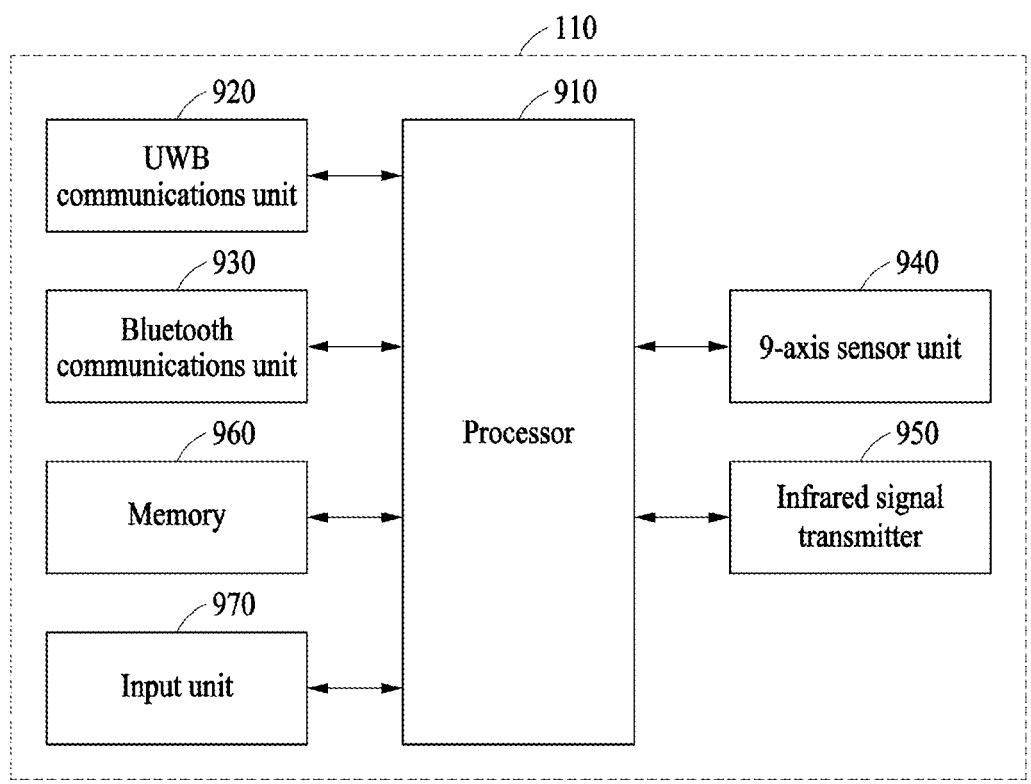
FIG. 9 is a block diagram illustrating an example configuration of a remote control in a remote control system according to various embodiments.

FIG. 9 is a block diagram illustrating an example configuration of a remote control in a remote control system according to various embodiments.

Referring to FIG. 9, a remote control 110 may include a processor (e.g., including processing circuitry) 910, a UWB communications unit (e.g., including communication circuitry) 920, a Bluetooth communications unit (e.g., including communication circuitry) 930, a 9-axis sensor unit (e.g., including a 9-axis sensor) 940, an infrared signal transmitter 950, a memory 960, and an input unit (e.g., including input circuitry) 970.

The UWB communications unit 920 may include various communication circuitry and performs UWB communications through an UWB antenna, and uses the UWB communications with a first UWB anchor included in a display device 120 to measure a first distance that is a distance between the first UWB anchor and the remote control 110, and uses the UWB communications with a second UWB anchor 130 to measure a second distance that is a distance between the second UWB anchor 130 and the remote control 110.

The Bluetooth communications unit 930 may include various Bluetooth communication circuitry and performs Bluetooth communications through a Bluetooth antenna to transmit and receive UWB-related information such as a UWB ID and transmits the relative coordinates of the remote control 110 to the display device 120 when the relative coordinates of the remote control 110 are identified under the control of the processor 910. Herein, the UWB-related information and the relative coordinates of the remote control 110 are transmitted and received through the Bluetooth communications unit 930, but communications techniques (e.g., Wi-Fi and infrared communications) other than Bluetooth may be used.

The 9-axis sensor unit 940 includes a 9-axis sensor and measures a first angle that is an angle between a first direction when the remote control 110 points at the first UWB anchor included in the display device 120 and a second direction when the remote control 110 points at the second UWB anchor 130. Also, the 9-axis sensor unit 940 detects a movement of the remote control 110 to provide the movement information to the processor 910.

The 9-axis sensor unit 940 may detect a change in the 9-axis of the remote control 110 and transmit the detected information to the processor 910. The 9-axis sensor unit 940 may include at least one of a magnetic sensor, an acceleration sensor or a gyroscope sensor. Herein, the movement and orientation angle of the remote control 110 are estimated through the 9-axis sensor unit 940. However, other devices in addition to the 9-axis sensor unit 940 may estimate the movement or orientation angle of the remote control 110.

The processor 910 may include various processing circuitry and identify the relative coordinates of the remote control 110 based on the display device 120, using the first distance, the second distance, and the first angle from the remote control 110 and determine the orientation direction of the remote control 110 through the 9-axis sensor unit 940.

When the processor 910 detects a key input that requests registration through the input unit 970, it may transmit to the display device 120 the relative coordinates of the remote control 110 as the position of the control target device. In this case, before the key of requesting registration is input, a user brings the remote control 110 close to the control target device for registration to put the remote control 110 in the same position as the control target device.

When the processor 910 transmits the relative coordinates of the remote control 110 and the orientation direction of the remote control 110 to the display device 120, receives from the display device 120 the information about a control target device existing in the orientation direction, and detects a key input through the input unit 970, it may convert the detected key into a corresponding control signal and transmit the signal to the target control device.

When detecting a key input through the input unit 970, the processor 910 may transmit the relative coordinates of the remote control 110 and the orientation direction of the remote control 110 to the display device 120, receive information on the control target device existing in the orientation direction from the display device, use the information of the control target device to convert the detected key into a corresponding control signal, and transmit the signal to the control target device.

The infrared signal transmitter 950 may transmit an infrared control signal to control the display device that is subject to control or the control target device.

The memory 960 may store an operating system and application programs for controlling the overall operation of the remote control 110 or relevant data. Also, the memory 960 may store information about a control target device to remotely control.

The memory 960 may include read-only memory (ROM), random-access memory (RAM), or a memory card (e.g., a micro secure digital (SD) card and a universal serial bus (USB) memory, not shown) mounted in the remote control 110. In addition, the memory 960 may include a non-volatile memory, a volatile memory, a hard disk drive (HDD), or a solid state drive (SSD).

According to an example embodiment, the memory 960 may include at least one type of storage media among a flash memory type, a hard disk type, a multimedia card micro type, a card type memory (e.g., an SD or an XD memory), RAM, static RAM, ROM, electrically erasable programmable ROM (EEPROM), programmable Read-Only Memory (PROM), a magnetic memory, a magnetic disk, and an optical disk.

The input unit 970 may include various input circuitry and receives an input from a user of the remote control 110 and provides the input to the processor 910. The input unit 970 may have a plurality of function keys such as numeric keys 0 to 9, a menu key, a cancel key (clear), a confirmation key, a power (ON), an end key (END), an Internet access key, navigation keys, and may include a keypad that provides to the processor 910 key input data corresponding to a key pressed by the user.

Figure 10:
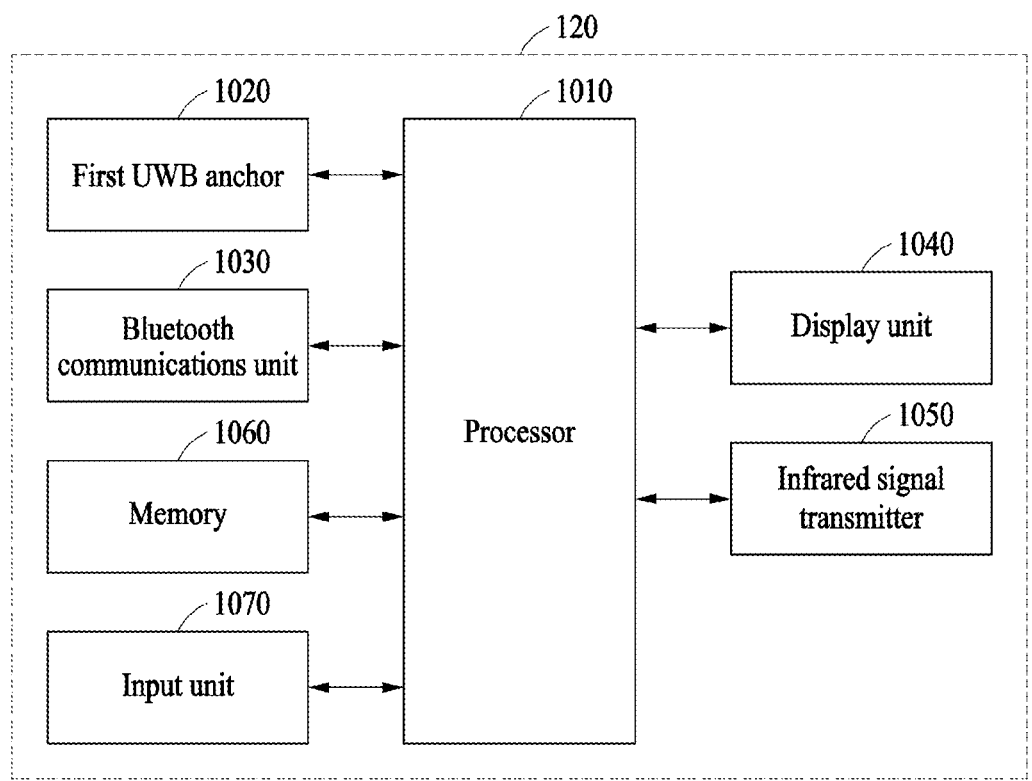
FIG. 10 is a block diagram illustrating an example configuration of a display device in a remote control system according to various embodiments.

FIG. 10 is a block diagram illustrating an example configuration of a display device in a remote control system according to various embodiments.

Referring to FIG. 10, a display device 120 may include a processor (e.g., including processing circuitry) 1010, a first UWB anchor 1020, a Bluetooth communications unit (e.g., including communication circuitry) 1030, a display unit (e.g., including a display) 1040, an infrared signal transmitter 1050, a memory 1060 and an input unit (e.g., including input circuitry) 1070.

The first UWB anchor 1020 may perform UWB communications through an UWB antenna to measure a first distance that is a distance to the remote control.

The display device 120 herein is configured to include the first UWB anchor 1020. When the display device 120, however, is large enough to have the first UWB anchor and the second UWB anchor spaced apart by a predetermined distance, the display device 120 may be configured to include both the first and the second UWB anchors.

The Bluetooth communications unit 1030 may include various Bluetooth communication circuitry and performs Bluetooth communications through a Bluetooth antenna to transmit and receive UWB-related information such as UWB ID and communicates with the remote control 110 to receive a first distance that is a distance between the remote control and the first UWB anchor and a second distance that is a distance between the remote control and the second UWB anchor 130.

In addition, the Bluetooth communications unit 1030 communicates with the remote control 110 to receive a first angle that is an angle between a first direction when the remote control 110 points at the first UWB anchor included in the display device 120 and a second direction when the remote control 110 points at the second UWB anchor.

The UWB-related information, the first distance, the second distance, and the first angle are transmitted and received through the Bluetooth communications unit 1030. However, other communication techniques (e.g., Wi-Fi, infrared communication, etc.) in addition to the Bluetooth may be used.

The display unit 1040 may include a display and output an image signal processed under the control of the processor 1010. In addition, under the control of the processor 1010, the display 1040 may output the relative coordinates of the remote control 110, the relative coordinates of the control target device existing in the orientation direction of the remote control 110, a list of registerable control target devices, and a list of control target devices existing in the orientation direction of the remote control 110.

The infrared signal transmitter 1050 may transmit an infrared control signal for the control of the control target device.

The processor 1010 may include various processing circuitry and identify the first distance that is a distance between the remote control 110 and the first UWB anchor and the second distance that is a distance between the remote control 110 and the second UWB anchor 130, identify the first angle between the first direction when the remote control 110 points to the first UWB anchor and the second direction when the remote control 110 points to the second UWB anchor 130, or a third distance that is a distance between the first UWB anchor and the second UWB anchor, identify the relative coordinates of the remote control 110 based on the display device 120, using the first distance, the second distance and the third distance, and determine the orientation direction of the remote control 110 when receiving a 9-axis sensor value.

When receiving the occurrence of a registration of a control target device from the remote control 110, the processor 1010 may confirm relative coordinates of the remote control 110 and register the identified relative coordinates of the remote control 110 as a position of the control target device.

The processor 1010 may identify whether a control target device exists in the orientation direction of the remote control 110 based on the relative coordinates of the remote control 110, identify the information of the control target device, if any, convert an input into a control signal corresponding to the control target device upon the receipt of the input to control the control target device from the remote control 110, and transmit the control signal to the control target device.

The memory 1060 may store an operating system for controlling the overall operation of the display device 120, an application program, a graphical user interface (GUI) related to the application program, an object for providing the GUI. and others (e.g., image text, an icon, a button) or related data. Also, the memory 1060 may store the information on the control target device for the remote control.

The memory 1220 may include ROM, RAM, and a memory card mounted on the display device 1200 (e.g., a micro secure digital (SD) card and a universal serial bus (USB) memory, not shown). In addition, the memory 1060 may include a non-volatile memory, a volatile memory, a hard disk drive (HDD), or a solid state drive (SSD).

According to an example embodiment, the memory 1060 may include at least one type of storage media among a flash memory type, a hard disk type, a multimedia card micro type, a card memory type (e.g., SD or XD memory), RAM, static RAM, ROM, electrically erasable programmable ROM (EEPROM), programmable ROM (PROM), a magnetic memory, a magnetic disk, and an optical disk.

The input unit 1070 may include various input circuitry and receives a user's input of the display device 120 and provides it to the processor 1010. The input unit 1070 may have a plurality of function keys such as numeric keys 0 to 9, a menu key, a cancel key (clear), a confirmation key, a power (ON), an end key (END), an Internet access key, navigation keys, etc. and may include a keypad that provides, to the processor 1010, key input data corresponding to a key pressed by the user.

Hereinafter, a method according to example embodiments as described herein will be described in greater detail with reference to the drawings.

Figure 11:
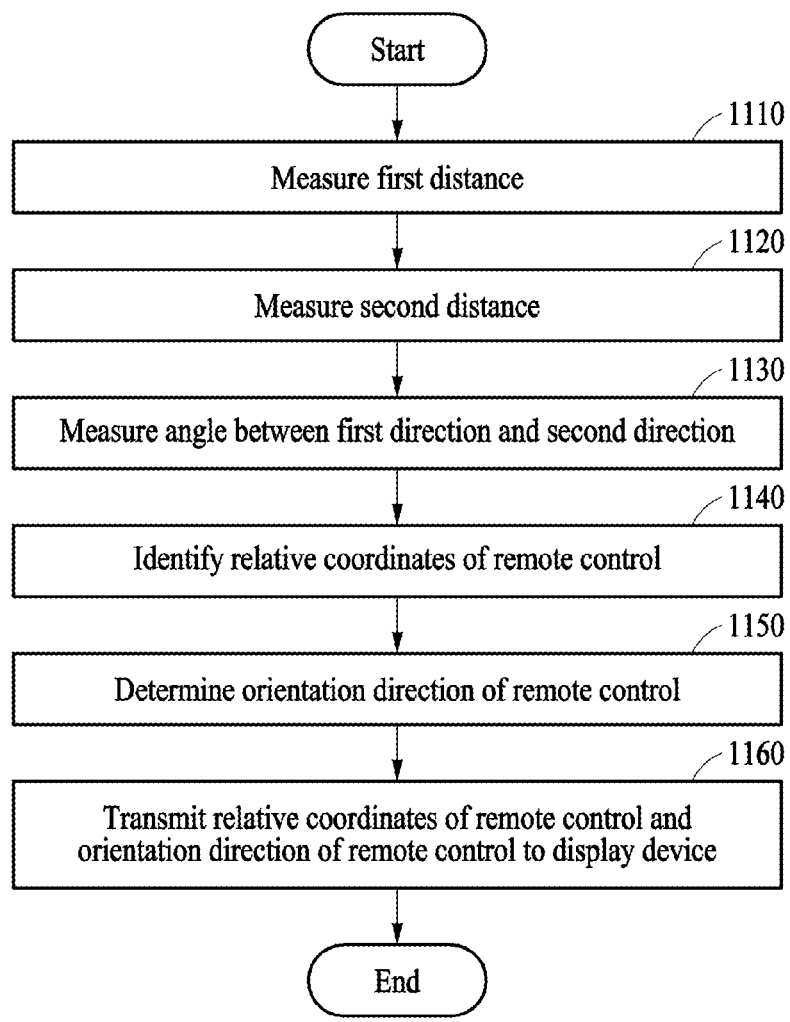
FIG. 11 is a flowchart illustrating an example process of identifying the relative coordinates of a remote control and the orientation direction of the remote control in the remote control of a remote control system according to various embodiments.

FIG. 11 is a flowchart illustrating an example process of identifying the relative coordinates of a remote control and the orientation direction of the remote control in the remote control of a remote control system according to various embodiments.

Referring to FIG. 11, a remote control 110 measures a first distance, which is a distance between a first UWB anchor included in a display device 120 and the remote control 110, using UWB communications in operation 1110.

Then, the remote control 110 measures a second distance, which is a distance between a second UWB anchor 130 and the remote control 110, using UWB communications in operation 1120. In this case, the second UWB anchor 130 is spaced apart from the first UWB by a predetermined distance or more. However, when the display device 120 is large, the first UWB anchor and the second UWB anchor may be installed separately from one another in the display device 120.

The remote control 110 measures a first angle that is an angle between a first direction when the remote control 110 points at the first UWB anchor and a second direction when the remote control 110 points at the second UWB anchor 130 in operation 1130. The remote control 110 may detect and measure a change in a 9-axis sensor value between the first direction and the second direction in operation 1130.

Operations 1110, 1120, and 1130 may project the remote control 110, the first UWB anchor included in the display device 120 and the second UWB anchor 130 on a two-dimensional plane for measurement, using the measured distance values and 9-axis sensor value.

The remote control 110 identifies the relative coordinates of the remote control 110 based on the display device 120, using the first distance, the second distance, and the first angle in operation 1140.

The remote control 110 determines an orientation direction of the remote control 110 in operation 1150. In this operation, the remote control 110 may detect a change in the 9-axis sensor value to identify the orientation direction of the remote control 110.

The remote control 110 transmits its relative coordinates and its orientation direction to the display device 120 in operation 1160.

When receiving the relative coordinates of the remote control 110, the display device 120 may display relative positions among the first UWB anchor, the second UWB anchor 130, and the remote control 110. That is, the display device 120 may display each relative position of the display device 120, the second UWB anchor 130, and the remote control 110 on its screen.

Figure 12:
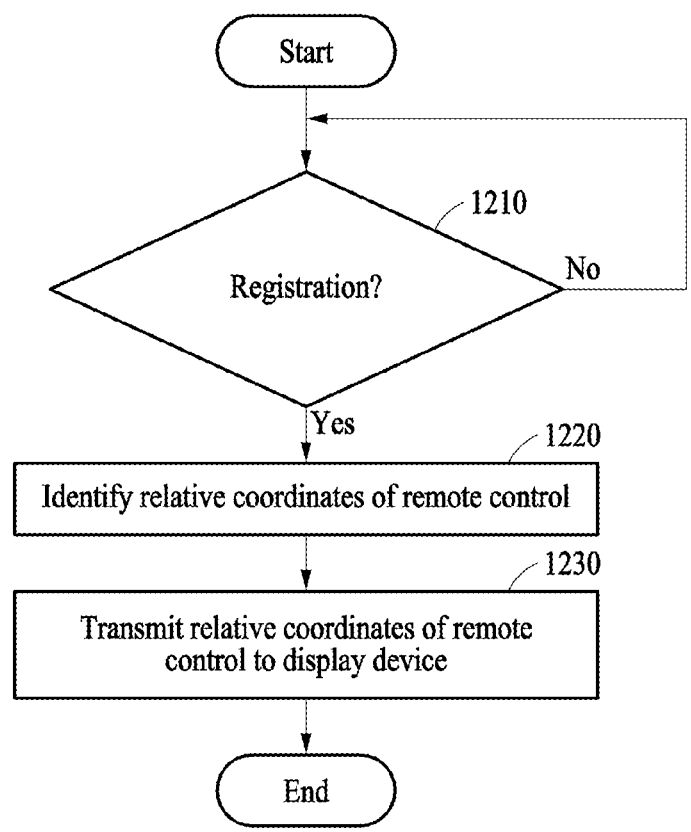
FIG. 12 is a flowchart illustrating an example process of registering a control target device in a remote control of a remote control system according to various embodiments.

FIG. 12 is a flowchart illustrating an example process of registering a control target device in a remote control of a remote control system according to various embodiments.

Referring to FIG. 12, when detecting a registration at a position close to a control target device register in operation 1210, a remote control 110 may identify its relative coordinates as described in FIG. 11 in operation 1220.

The remote control 110 transmits its relative coordinates to the display device 120 in operation 1230. For example, the remote control 110 provides its position to the display device 120 as the position of the control target device.

Figure 13:
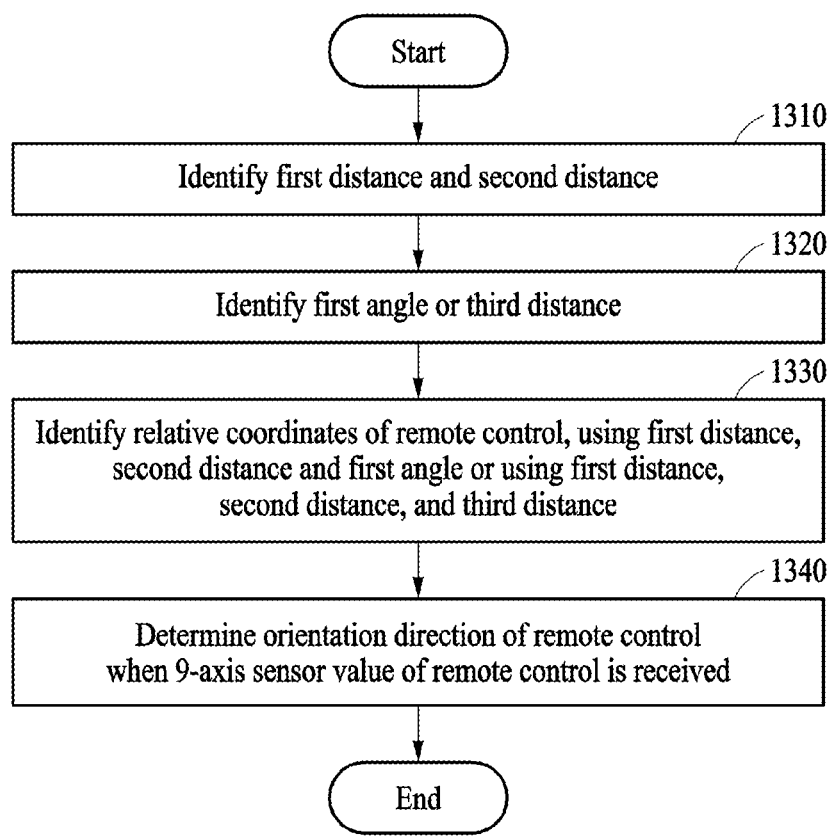
FIG. 13 is a flowchart illustrating an example process of identifying the relative coordinates of a remote control and the orientation direction of the remote control in a display device of a remote control system according to various embodiments.

FIG. 13 is a flowchart illustrating an example process of identifying the relative coordinates of a remote control and the orientation direction of the remote control in a display device of a remote control system according to various embodiments.

Referring to FIG. 13, the display device 120 identifies a first distance that is a distance between a remote control 110 and a first UWB anchor, and a second distance that is a distance between the remote control 110 and a second UWB anchor 130 in operation 1310.

In this operation, at least one of the first UWB anchor or the second UWB anchor 130 may be included in the display device 120. In addition, the first UWB anchor and the second UWB anchor 130 are spaced apart from each other by a predetermined distance or more for triangulation.

In operation 1310, the display device 120 receives the first distance measured using UWB communications from the remote control 110, and the second distance measured using UWB communication from the remote control 110.

The display device 120 identifies a first angle that is an angle between the first direction when the remote control 110 points at the first UWB anchor and the second direction when the remote control 110 points at the second UWB anchor 130, or a third distance that is a distance between the first UWB anchor and the second UWB anchor 130 in operation 1320.

In this operation, the display device 120 may receive from the display device 120 the first angle measured by the remote control 110.

In operation 1320, the third distance may be identified by receiving the third distance measured using UWB communications from the first UWB anchor or by identifying the third distance measured and stored in advance.

In addition, the display device 120 identifies the coordinates of the remote control 110 based on its position, on the basis of triangulation using the first distance, the second distance and the first angle, or using the first distance, the second distance, and the third distance in operation 1330. In this operation, when identifying the relative coordinates of the remote control 110, the display device 120 may display its relative coordinates and the relative coordinates of the remote control 110.

When receiving the 9-axis sensor value of the remote control 110 from the remote control 110, the display device 120 determines an orientation direction of the remote control 110 in operation 1340.

Figure 14:
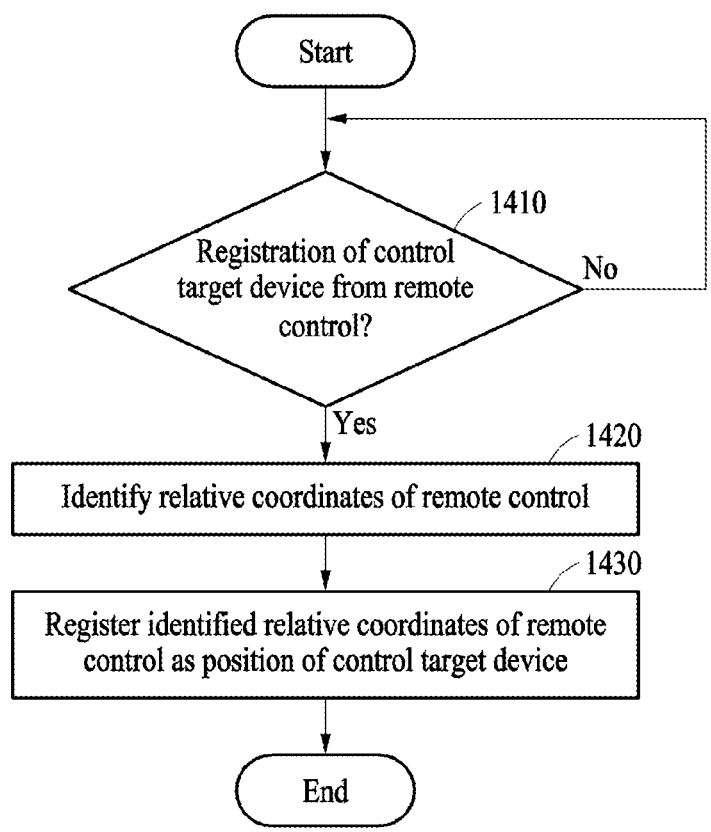
FIG. 14 is a flowchart illustrating an example process of registering a control target device in a display device of a remote control system according to various embodiments.

FIG. 14 is a flowchart illustrating an example process of registering a control target device in a display device of a remote control system according to various embodiments.

Referring to FIG. 14, when the display device 120 receives the occurrence of a registration of a control target device from the remote control 110 in operation 1410, it identifies the coordinates of the remote control 110 as described above in FIG. 13 in operation 1420.

Then, the display device 120 registers the identified relative coordinates of the remote control 110 as the position of the control target device in operation 1430. That is, the remote control may perceive the occurrence of a registration as the remote control 110 being adjacent to a control target device to register and identify the relative coordinates of the remote control 110 as the position of the control target device.

Figure 15:
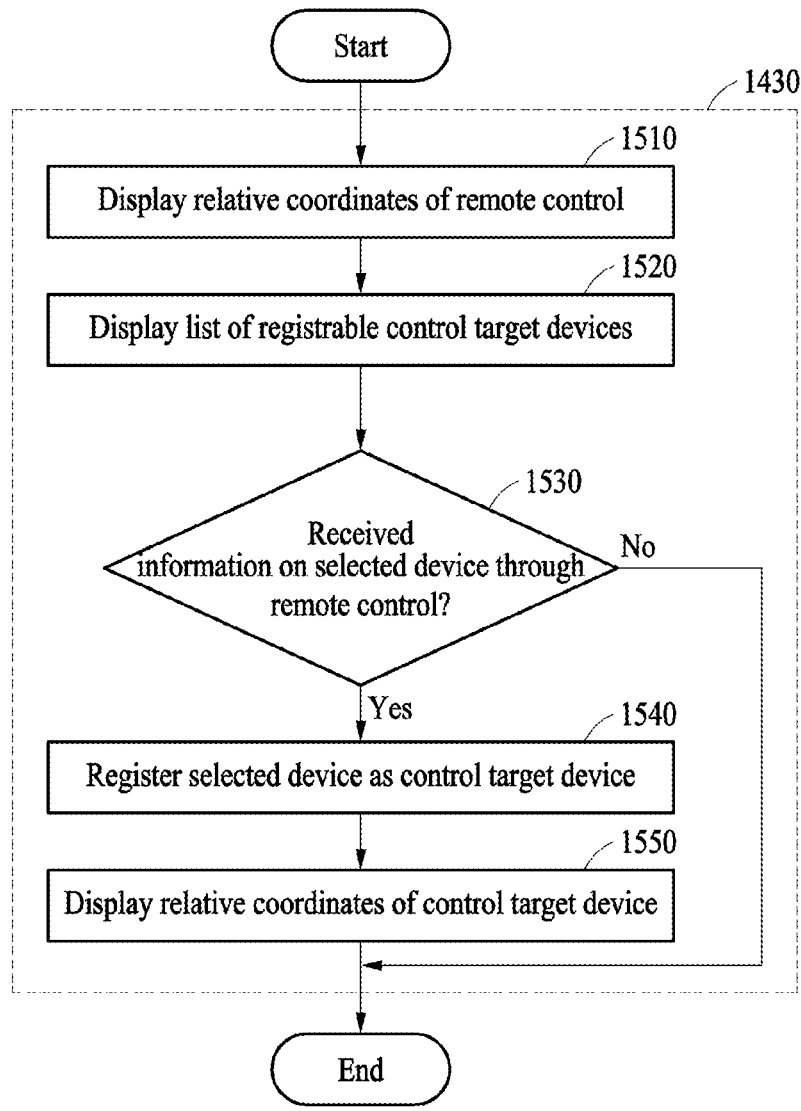
FIG. 15 is a flowchart illustrating an example process of registering a control target device in a display device of a remote control system according to various embodiments.

FIG. 15 is a flowchart illustrating an example process of registering a control target device in a display device of a remote control system according to various embodiments.

Referring to FIG. 15, the display device 120 displays the confirmed relative coordinates of the remote control 110 in operation 1510.

The display device 120 searches for and displays a list of control target devices currently registrable in operation 1520.

When the display device 120 receives the information on the control target device selected to register in operation 1530, the display device 120 registers the selected device through the remote control 110 as the control target device in operation 1540.

The display device 120 displays the relative coordinates of the control target device in operation 1550. In this case, operations 1510 and 1550 in FIG. 5 may be omitted.

Figure 16:
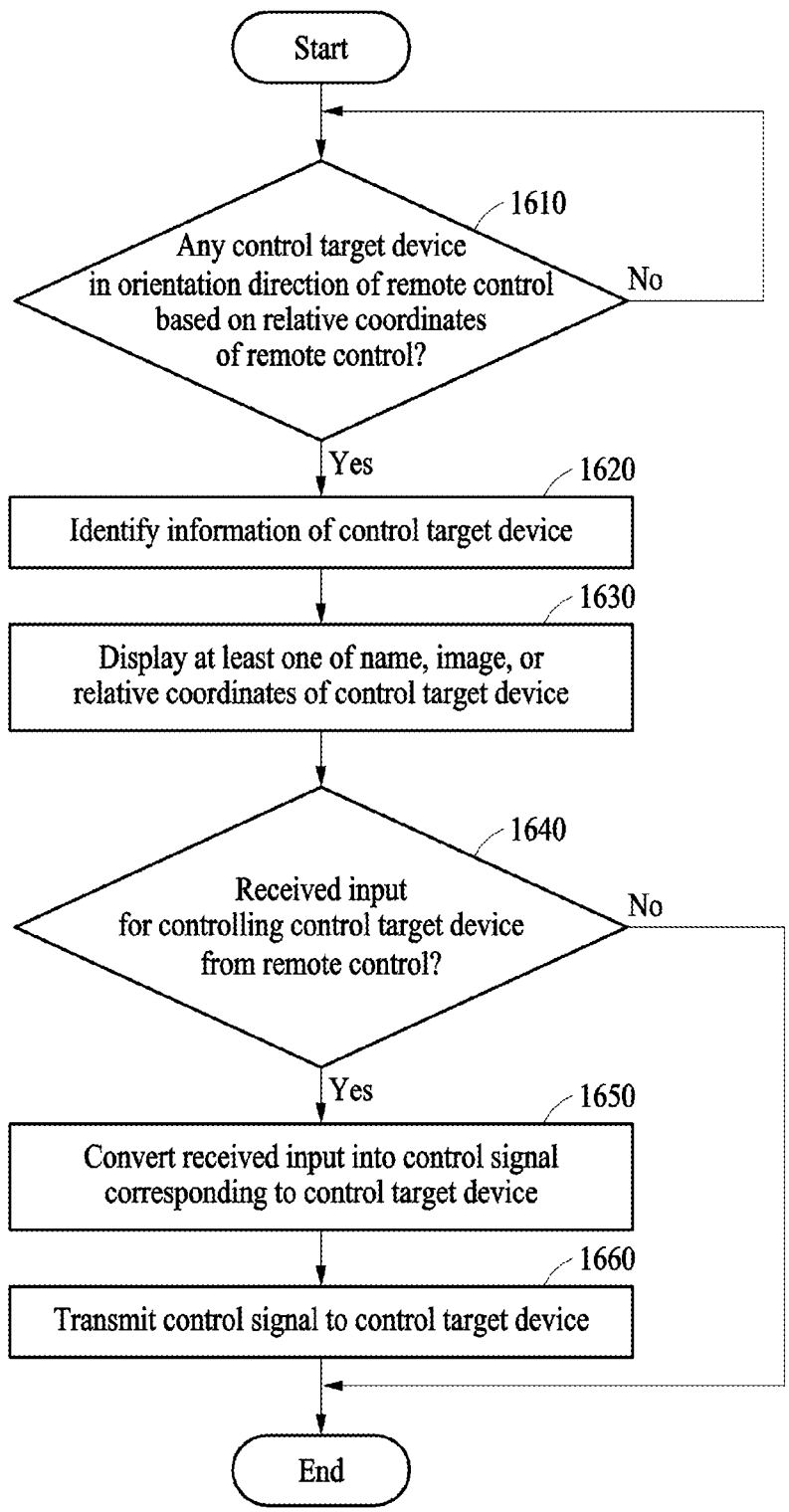
FIG. 16 is a flowchart illustrating an example process of controlling a control target device existing in the orientation direction of a remote control in a display device of a remote control system according to various embodiments.

FIG. 16 is a flowchart illustrating an example process of controlling a control target device existing in the orientation direction of a remote control in a display device of a remote control system according to various embodiments.

Referring to FIG. 16, a display device 120 identifies whether a control target device exists in the orientation direction of the remote control 110 based on the relative coordinates of the remote control 110 in operation 1610.

When the control target device exists in operation 1610, the display device 120 identifies the information on the control target device existing in the orientation direction of the remote control 110 in operation 1620.

In addition, the display device 120 displays at least one of a name, an image, or a relative position of the control target device existing in the orientation direction of the remote control 110 based on the relative coordinates of the remote control 110 in operation 1630.

When the display device 120 receives an input for controlling the control target device from the remote control 110 in operation 1640, it converts the received input into a control signal corresponding to the control target device in operation 1650.

Then, the display device 120 transmits the control signal to the control target device in operation 1660. In this operation, the control signal may be transmitted as an infrared signal or using Bluetooth or Wi-Fi communications.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A remote control method using ultra-wideband (UWB) in a display device of a remote control system, the remote control method comprising:
   identifying, by a display device, a first distance between a remote control and a first UWB anchor and a second distance between the remote control and a second UWB anchor;
   identifying, by the display device, a first angle between a first direction based on the remote control pointing at the first UWB anchor and a second direction based on the remote control pointing at the second UWB anchor or a third distance between the first UWB anchor and the second UWB anchor;
   identifying, by the display device, relative coordinates of the remote control based on the display device, using the first distance, the second distance and the first angle, or using the first distance, the second distance and the third distance; and
   determining, by the display device, an orientation direction of the remote control at the time of receiving a 9-axis sensor value of the remote control from the remote control.

2. The remote control method of claim 1, wherein the first UWB anchor and the second UWB anchor are spaced apart by a specified distance or more.

3. The remote control system of claim 1, wherein at least one of the first UWB anchor and the second UWB anchor is included in the display device.

4. The remote control method of claim 1, wherein the identifying of the first distance and the second distance by the display device comprises:
   receiving, by the display device, the first distance measured using UWB communications from the remote control; and
   receiving, by the display device, the second distance measured using UWB communications from the remote control.

5. The remote control method of claim 1, wherein the identifying of the first angle in the display device comprises:
   receiving, by the display device, the first angle measured by the remote control from the remote control.

6. The remote control method of claim 1, wherein the identifying of the third distance by the display device comprises:
   receiving, by the display device, the third distance measured using UWB communications from the first UWB anchor or identifying the third distance measured and stored in advance.

7. The remote control method of claim 1, further comprising
   displaying, by the display device, the relative coordinates of the display device and the relative coordinates of the remote control based on the relative coordinates of the remote control being identified.

8. The remote control method of claim 1, further comprising:
   identifying, by the display device, the relative coordinates of the remote control based on occurrence of a registration of a control target device being received from the remote control; and
   registering the coordinates of the remote control identified by the display device as a position of the control target device.

9. The remote control method of claim 8, wherein the registering of the relative coordinates of the remote control identified by the display device as the position of the control target device comprises:
   displaying, by the display device, the relative coordinates of the identified remote control;
   displaying, by the display device, a list of registrable control target devices;
   receiving, by the display device, selection of the control target device to register through the remote control; and
   registering, by the display device, the selected device through the remote control as the control target device and displaying the relative coordinates of the control target device.

10. The remote control method of claim 1, further comprising
    identifying, by the display device, whether a control target device exists in the orientation direction of the remote control based on the relative coordinates of the remote control and, based on the identifying, displaying at least one of a name, an image or relative coordinates of the control target device existing in the orientation direction of the remote control at the relative coordinates of the remote control.

11. The remote control method of claim 1, further comprising:
    identifying, by the display device, whether a control target device exists in the orientation direction of the remote control at the relative coordinates of the remote control and, based on the identifying, identifying information on the control target device; and based on the display device receiving an input to control the control target device from the remote control, converting the received input into a control signal corresponding to the control target device and transmitting the control signal to the control target device.

12. A display device of a remote control system using ultra-wideband (UWB), the display device comprising:
   a communications unit, comprising communication circuitry, configured to perform communications with a remote control; and
   processing circuitry configured to: identify a first distance between the remote control and a first UWB anchor and a second distance between the remote control and a second UWB anchor; identify a first angle between a first direction based on the remote control pointing at the first UWB anchor and a second direction based on the remote control pointing at the second UWB anchor or a third distance between the first UWB anchor or the second UWB anchor; identify relative coordinates of the remote control, using the first distance, the second distance, and the first angle or using the first distance, the second distance, and the third distance; and determine an orientation direction of the remote control upon receipt of a 9-axis sensor value of the remote control from the remote control.

13. The display device of claim 12, comprising at least one of the first UWB anchor or the second UWB anchor.

14. The display device of claim 12, further comprising a display unit comprising a display configured to display the relative coordinates of the display device and the relative coordinates of the remote control based on the relative coordinates of the remote control being identified.

15. The display device of claim 12, wherein the processing circuitry is configured to identify the relative coordinates of the remote control based on receiving an occurrence of a registration of a control target device from the remote control and to register the identified relative coordinates of the remote control as a position of the control target device.

16. The display device of claim 12, wherein the processing circuitry is configured to: identify whether a control target device exists in the orientation direction of the remote control based on the relative coordinates of the remote control, identify information of the control target device, convert an input into a control signal corresponding to the control target device upon the receipt of the input to control the control target device, and transfer the control signal to the control target device.

17. A remote control method using ultra-wideband (UWB) in a remote control of a remote control system, the remote control method comprising:
   measuring, by the remote control, a first distance between a first UWB anchor included in a display device and the remote control, using UWB communications;
   measuring, by the remote control, a second distance between a second UWB anchor and the remote control, using UWB communications;
   measuring, by the remote control, a first angle between a first direction based on the remote control pointing at the first UWB anchor and a second direction based on the remote control pointing at the second UWB anchor;
   identifying, by the remote control, relative coordinates of the remote control based on the display device, using the first distance, the second distance, and the first angle; and
   determining, by the remote control, an orientation direction of the remote control, using a 9-axis sensor value.

18. The remote control method of claim 17, further comprising
   identifying, by the remote control, the relative coordinates of the remote control based on the remote control detecting occurrence of a registration; and
   transmitting the relative coordinates of the remote control identified by the remote control to the display device.

19. The remote control method of claim 17, wherein the first UWB anchor and the second UWB anchor are spaced apart from one another by a specified distance or more and at least one of the first UWB anchor and the second UWB anchor is included in the display device.

20. The remote control method of claim 17, wherein the measuring of the first angle between the first direction and the second direction comprises detecting and measuring a change in a 9-axis sensor value between the first direction and the second direction.

* * * * *